United States Patent [19]

Mann

[11] 4,303,040
[45] Dec. 1, 1981

[54] PROTECTED FEEDER FOR LIVESTOCK

[76] Inventor: Fred W. Mann, Box 444, Waterville, Kans. 66549

[21] Appl. No.: 146,127

[22] Filed: May 2, 1980

[51] Int. Cl.³ .............................................. A01K 5/00
[52] U.S. Cl. ...................................................... 119/62
[58] Field of Search .................. 119/62, 52 R, 51 R, 119/61, 159, 157, 66

[56] References Cited

U.S. PATENT DOCUMENTS

| | | | |
|---|---|---|---|
| 2,709,988 | 6/1955 | Hatcher | 119/62 |
| 2,933,063 | 4/1960 | Geerlings | 119/62 X |
| 3,187,722 | 6/1965 | Gilmore et al. | 119/157 |
| 3,400,688 | 9/1968 | Koinzan | 119/51 R |
| 3,821,940 | 7/1974 | Mann | 119/159 |
| 3,941,096 | 3/1976 | Mann | 119/159 |
| 4,023,533 | 5/1977 | Mann | 119/159 |

Primary Examiner—Hugh R. Chamblee
Attorney, Agent, or Firm—Fishburn, Gold and Litman

[57] ABSTRACT

A protected feeder is provided for livestock which comprises a receptacle with an open top supported at a selected position above a ground surface and adapted to contain a livestock attracting material therein, such as feed, salt or a mineral. A flexible cover member with a marginal portion which extends substantially beyond the top edge of the receptacle is mounted on the support structure in covering relation to the open top of the receptacle and livestock are permitted to contact the marginal portion from underneath and displace a portion of the cover member upwardly to gain access to the livestock attracting material in the receptacle. The cover member has unsupported portions which tend to sag downwardly and arcuate access openings between its marginal portion and the top edge of the receptacle through which livestock can see and smell the attracting material and are encouraged to lift the cover member at the openings, although access can be had from anywhere around the receptacle. The cover member is substantially impervious and protects the livestock attracting material from weather and from contamination.

15 Claims, 6 Drawing Figures

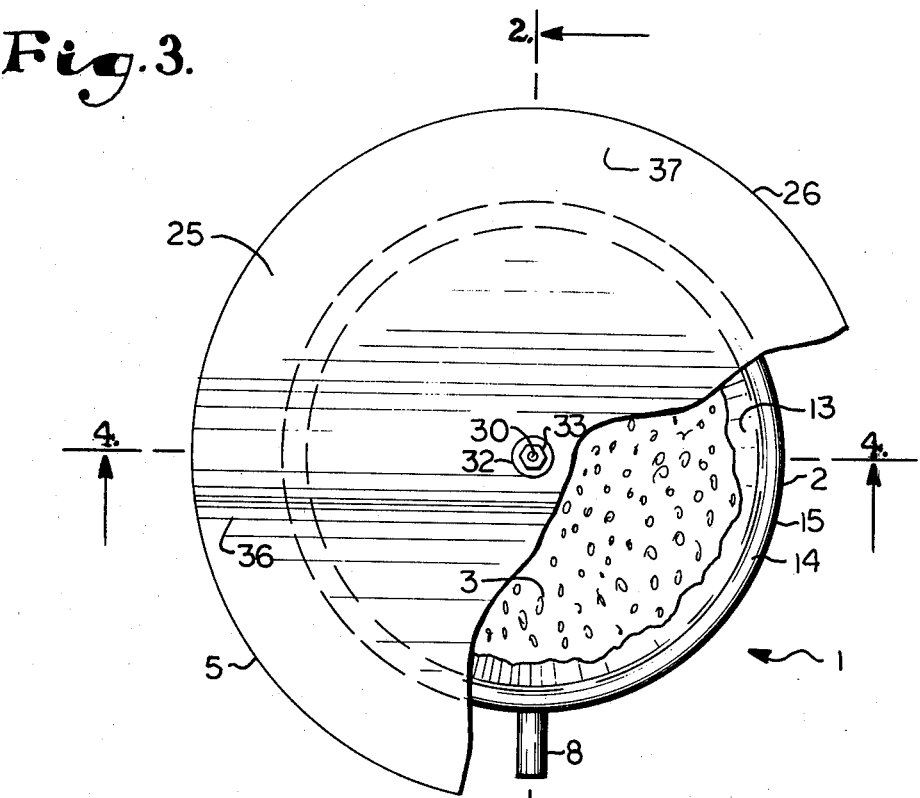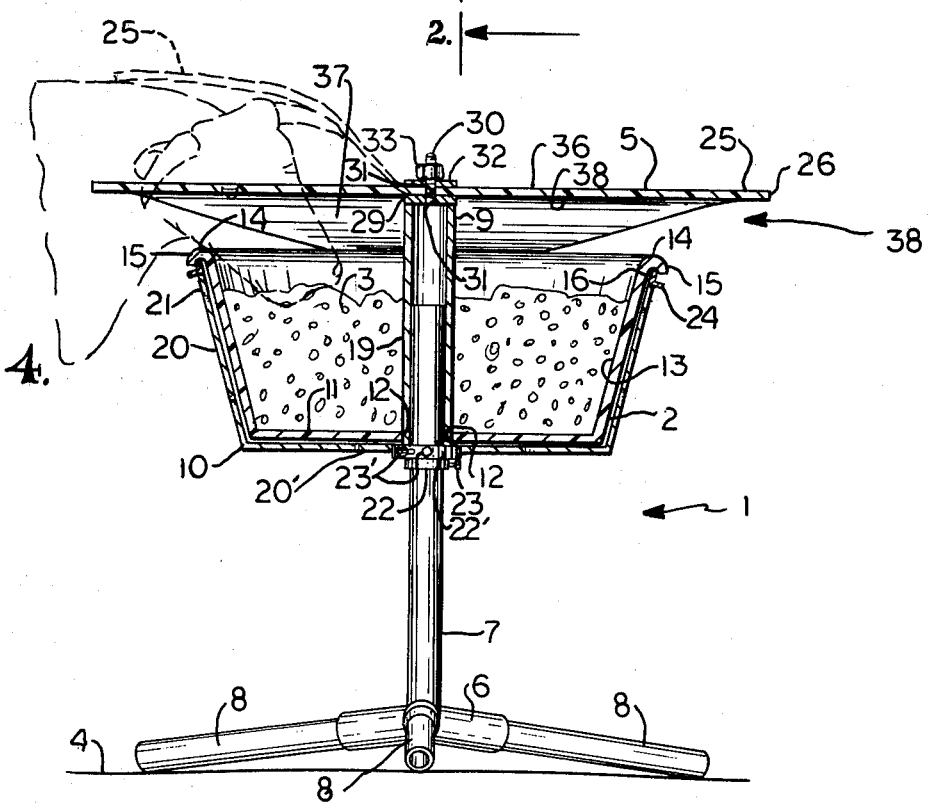

PROTECTED FEEDER FOR LIVESTOCK

BACKGROUND OF THE INVENTION

The present invention relates to feeders for livestock and in particular to a feeder having a flexible cover member in a covering relationship with respect to a receptacle containing a livestock attracting material such as feed, salt, a mineral or the like.

Protected feeders are known in the field of animal husbandry and a variety of different designs have been developed in an attempt to allow livestock access to feed or other attracting material and at the same time protect the material from the elements and contamination. One type of protected feeder which is illustrated in the Hatcher U.S. Pat. No. 2,709,988 comprises a trough with a pivotally mounted inflexible cover which may be pushed aside by livestock to gain access to feed or salt. However, feeders such as these having pivotally mounted inflexible covers tend to be cumbersome for the animals to use and do not protect the feed or other attracting material while the livestock are feeding. Also, the inflexible hoods must be spaced from the receptacle for the attracting material a sufficient distance to allow the livestock access thereto which, in turn, leaves substantial open areas unprotected for rain, snow, contamination or the like to blow into the receptacle and damage the attracting material whether livestock are using the receptacle or not.

In the present device the cover is positioned relatively close to the open top of the receptacle for the attracting material and thereby prevents alien material from falling or blowing into the receptacle, yet the cover is flexible or pliable enough that the livestock may engage and raise it to gain access to the attracting material. Preferably the cover tends to shroud the portion of the animal's body extending into the receptacle, thereby protecting the contents of the receptacle from weather and contamination while the livestock are feeding.

Heretofore, there has not been available a protected feeder for livestock which utilizes a simple yet efficient flexible cover member which livestock may flex upwardly and thereby feed in an open-top receptacle. The present invention provides a feeder with such a flexible cover, and because the cover is only displaced when and where the livestock physically engage it, the feed material remains protected. When animals are no longer feeding and leave the feeder, the flexible cover member is free to drop back to the protecting position thereof and thereby keep the remaining feed or the receptacle clean and dry. Even while feeding the bodies of the livestock shield the feeder where the cover is raised, and the entire feeder and its contents are substantially protected against the elements.

Insecticide applicators have been used in conjunction with protected feeders as exemplified by my U.S. Pat. No. 3,821,940, No. 3,941,096 and No. 4,023,533 and the Gilmore et al U.S. Pat. No. 3,187,772. While the contents of such a feed receptacle may be shielded from weather by the insecticide dispenser, there remains the problem of contamination by the insecticide material. Therefore, it is foreseen that applicant's structure is adapted for use with an insecticide dispensing device and avoids contamination problems created by the insecticide in addition to other possible contaminates.

SUMMARY OF THE INVENTION

The principal objects of the present invention are: to provide a feeder for livestock which affords a high degree of protection to livestock attracting material from weather and contamination; to provide such a feeder which allows livestock easy and convenient access to the livestock attracting material contained therein; to provide a livestock feeder which is easily filled or replenished with feed or other livestock attracting material; to provide such a feeder having a flexible, substantially impervious cover member which can be readily upwardly displaced by livestock to gain access to the feed or other livestock attracting material beneath and protected by the cover; to provide a protected feeder with such a cover having a marginal portion extending substantially beyond the top edge of the receptacle which may be engaged and upwardly displaced by livestock; to provide a livestock feeder with a cover which will reposition itself in protecting relationship over the livestock attracting material during and after use thereof by livestock; to provide a protected feeder with a flexible cover member which drapes over the top of the receptacle with downward flexing portions divided by contours whereby arcuate openings are defined between the peripheral edge of the cover member and the top edge of the receptacle; to provide an adjustable livestock feeder to allow for use by animals of different heights; to provide a livestock feeder with a feed receptacle and a flexible cover member independently vertically adjustable both with respect to each other and with respect to their respective heights above a ground surface; to provide a livestock feeder which may be readily disassembled and the component parts of which may be stacked substantially within similar parts for convenient transportation and storage; to provide a livestock feeder adapted for use with feed, mineral feeds, granular salt, and other nutrients which are damaged by water and which could heretofore not be fed in the field; to provide a protected feeder adapted for use in conjunction with a device for dispensing insecticide material which protects the feed from contamination by insecticide; and to provide such a protected feeder which is economical to manufacture, efficient in use, capable of a long operating life, and particularly well adapted for the proposed use thereof.

Other objects and advantages of this invention will become apparent from the following descriptions taken in conjunction with the accompanying drawings wherein are set forth by way of illustration and example, certain embodiments of this invention.

The drawings constitute a part of the specification and include an exemplary embodiment of the present invention and illustrate various objects and features of the protected feeder.

BRIEF DESCRIPTION OF THE DRAWINGS

FIG. 3 is a top plan view of the protected feeder with portions broken away to better illustrate component parts thereof.

FIG. 4 is a vertical cross-sectional view of the present invention taken along line 4—4 of FIG. 3 showing in phantom lines an animal feeding in the protected feeder.

DESCRIPTION OF THE PREFERRED EMBODIMENTS

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 1:
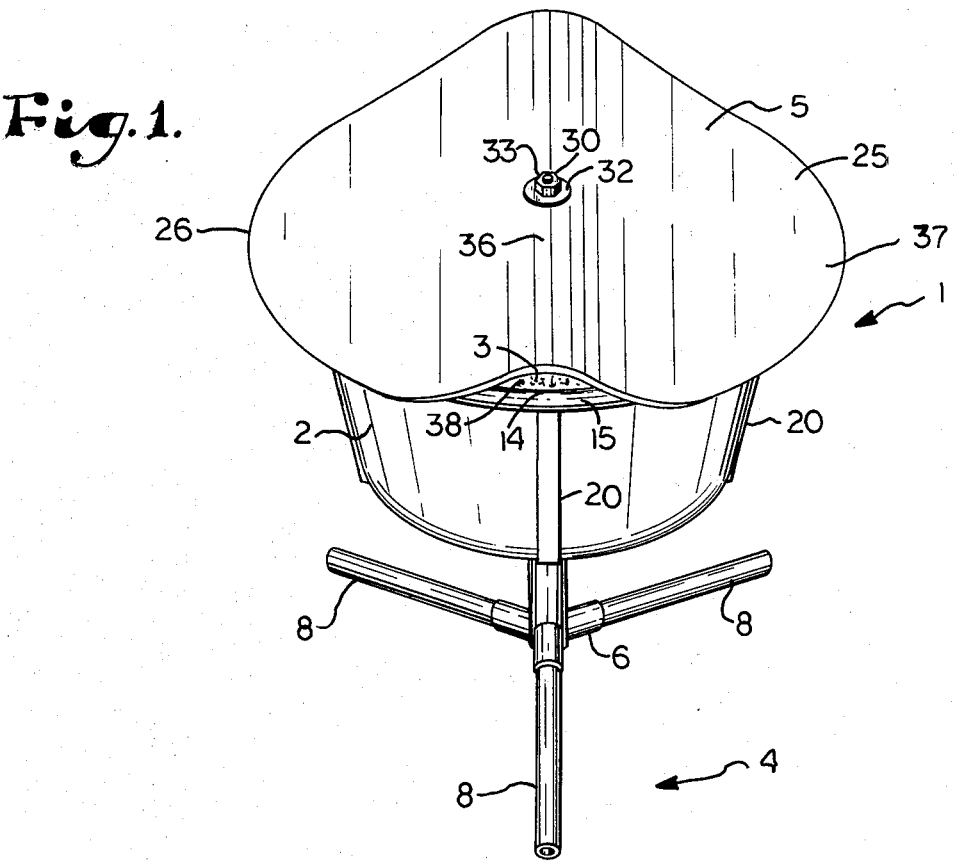
FIG. 1 is a perspective view of a protected animal feeder embodying features of the present invention.
Figure 2:
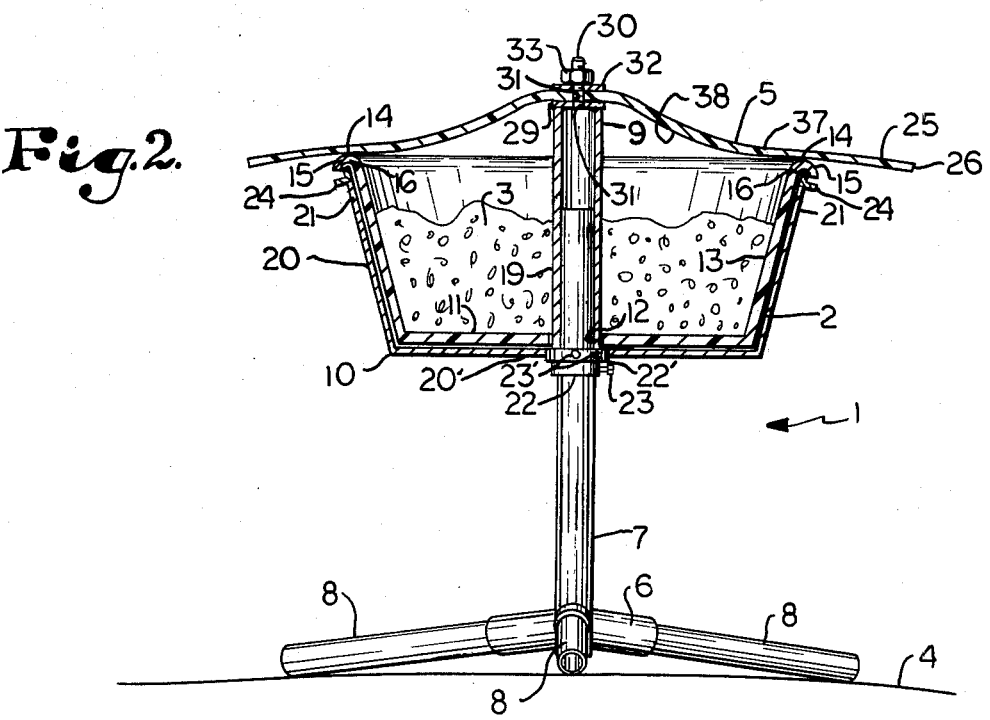
FIG. 2 is a vertical cross-sectional view of the protected feeder taken along line 2—2 of FIG. 3.
Figure 5:
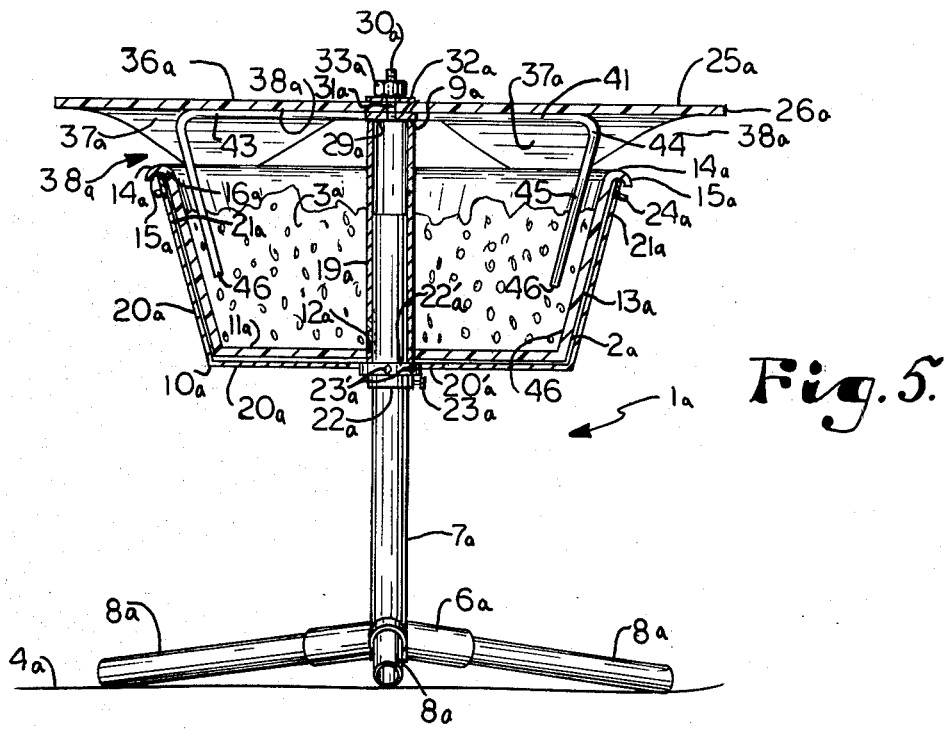
FIG. 5 is a vertical cross-sectional view of a modified form of a protected feeder taken along line 5—5 in FIG. 6.

For purposes of description herein, the terms "upper", "lower", "rear", "front", "vertical", "horizontal" and various directional derivatives thereof shall relate to the invention as oriented in FIG. 2 for the first embodiment and FIG. 5 for the second embodiment. However, it is to be understood that the invention may assume various alternative orientations except where expressly specified to the contrary.

Referring to the drawings in more detail:

In the first embodiment of the present invention as illustrated in FIGS. 1, 2, 3 and 4, the reference numeral 1 generally designates a protected feeder for livestock. The feeder 1 includes a receptacle 2 adapted to support a livestock attracting material such as feed, salt, minerals or the like 3 therein at a selected position above a ground or support surface 4. A flexible cover member 5 is mounted in covering relation above the open top of receptacle 2 for covering and protecting the livestock attracting material 3 from weather and contamination. The cover member 5 may be flexed upwardly by the livestock to thereby allow same to gain access to the livestock attracting material 3 through the open top of the receptacle 2. As illustrated in the first embodiment of the invention, the protected feeder 1 includes a base 6 and a pole or upright member 7 with a vertical axis extending upwardly therefrom. The base 6 includes a plurality of circumferentially spaced legs 8 engaging the support surface 4 and extending radially outwardly from the upright member 7. The base 6 may be positioned on or anchored to the support surface 4 in any desired manner. The receptacle 2 includes a bottom 11 with an aperture 12 in approximately the center thereof. The receptacle 2 also includes a side wall 13 with a top edge 14. The top edge 14 defines a rim 15 and a channel 16 around the periphery of the receptacle 2.

A telescoping member 19 is illustrated as a pipe having a slightly larger diameter than the upright member 7 upon which it is mounted and is slidably movable along and rotatable with respect to the upright member 7. The telescoping member 19 is supported by and rests on a first annular collar member 22 which is slidably secured to the upright member 7 by set screw 23. A receptacle support frame 10 is comprised of a second annular collar member 22' which is slidably secured to the telescoping member 19 by a pair of set screws 23' in the illustrated embodiment. A plurality of circumferentially spaced arms 20 having lower ends 20' are attached to the collar member 22' and extend outwardly and upwardly therefrom. A peripheral member 24 is comprised of an L-shaped angle member formed into a circle and attached to upper ends 21 of the arms 20 as shown. The channel 16 associated with the top edge 14 of the receptacle 2 is adapted for receiving the peripheral member 24 to thereby support the receptacle 2.

The receptacle side walls 13 and the circumferentially spaced arms 20 both have a slightly downwardly-converging configuration in the illustrated embodiment. This allows for convenient stacking of a plurality of receptacles 2 and receptacle support frames 10 substantially one within another when a plurality of disassembled protected feeders 1 are stored or transported.

In the first embodiment of the present invention as illustrated in FIGS. 1 through 4, a central portion of the cover member 5 is supported by the telescoping member 19 in spaced relationship above the level of the plane defined by the receptacle top edge 14 a sufficient amount to allow an animal desiring to feed in the receptacle to easily raise the cover member 5. The flexible cover member 5 has an aperture 21 through the approximate center thereof which is adapted for receiving therethrough a threaded shaft 30 which is attached to and extends upwardly from a circular plate 29 in the upper end 9 of the telescoping member 19. A suitable washer 32 is sleeved on the threaded shaft 30 above the cover member 5 and is held in position by a suitable nut 33.

Height adjustment of the receptacle 2 and the flexible cover member 5 may be achieved by varying the placement of the first annular collar member 22 along the upright member 7 and thereby raising or lowering the telescoping member 19. Because both the receptacle 2 and the flexible cover member 5 are supported by the telescoping member 19, they are maintained in a constant spaced relationship as the protected feeder 1 is adjusted to accommodate animals of varying heights. Similarly, the second annular collar member 22' allows for adjustment of the spaced relationship between the receptacle support frame 10 and the flexible cover member 5 and therefore the degree of protection offorded the feed material 3 from the elements. Because the receptacle telescoping member 19 and the receptacle support frame 10 thereon may be independently vertically adjusted both with respect to each other and with respect to a ground surface 4, the protected feeder 1 may assume a variety of configurations to respond to different feeding conditions. The rotatability of the telescoping member 19 with respect to the upright member 7 allows the receptacle 2 and the flexible cover member 5 to rotate about the upright member 7 if an animal exerts a lateral force against the protected feeder and thereby bending of and damage thereto is avoided.

The cover member 5 illustrated is of suitable size that a marginal portion 25 of the cover member 5 extends outwardly substantially beyond the top edge 14 of the receptacle 2 to a peripheral edge 26. In addition to providing greater protection for the feed material 3, the marginal portion 25 also allows livestock to engage the cover member 5 from underneath and thereby upwardly displace the flexible cover member. The cover member 5 is flexible and pliable and, although preferably comprised of a material which has an inherent characteristic of being at least partially self-supporting, tends to sag somewhat when only partially supported, as by the telescoping member 19. The sagging tendency of the flexible cover member 5 causes outward portions 37 thereof to flex downwardly towards the top edge 14 of the receptacle 2 with which the downwardly flexing outward portions 37 may have contact, as illustrated in FIGS. 2 and 3, or, alternatively, they may be in spaced relationship above the top edge 14 so that the flexible cover member 5 is supported only by the telescoping member 19. Portions of the flexible cover member 5 not deflected downwardly define contours 36 which are in spaced relationship above the top edge 14 of the receptacle 2.

In the first illustrated embodiment, the downward flexing portions 37 lie on opposite sides of the flexible cover member 5 and are divided by the contours 36. The contours 36 are generally aligned along a horizontal axis which intersects with and is perpendicular to a longitudinal axis of the telescoping member 19. The flexible cover member 5 thereby assumes an archlike configuration in covering relation to the receptacle 2 and defines arcuate access openings 38 on opposite sides thereof. Preferably, the cover member 5 extends outwardly from the receptacle top edge 14 so as to shield the access openings 38. Said arcuate access openings 38 occur between the marginal portion 25 of the flexible cover member 5 and the top edge 14 of the receptacle 2. The arcuate access openings 38 serve to encourage livestock to engage the marginal portion 25 of the flexible cover member 5 and upwardly displace same; thereby allowing access to the feed 3 in the receptacle 2. When the flexible cover member 5 assumes such an arcuate configuration the livestock can be feed material 3 through the arcuate access openings 38 and have access thereto by lifting the cover member 5. However, livestock may also gain access to the receptacle 2 at any point around the rim 15 thereof by engaging the marginal portion 25 of the cover member 5 and upwardly displacing same. In actual tests it has been observed that the more aggressive animals will engage and displace the cover member 5 at any point along the marginal portion 25 thereof while more timid animals are drawn to the arcuate access openings 38 and then displace the contours 36 of the flexible cover member 5 and thereby feed on the material 3 in the receptacle 2.

When livestock are feeding in the receptacle 2, the cover member 5 will be displaced upwardly only enough for the head and neck of the animal to pass between the marginal portion 25 and the receptacle top edge 14. The cover member 5 and the animals' bodies will tend to substantially cover the open top of the receptacle 2 and protect the contents of same from the elements. When the livestock are through feeding and withdraw from the feeder 1, the sagging tendency of the cover member 5 will cause it to resume its position in covering relation to the open top of the receptacle 2. The continuous protection thus afforded the livestock attracting material 3 by the cover member 5 makes the present invention particularly well adapted for feeding livestock in any type of weather condition and for use with feed materials and minerals 3 which would otherwise be harmed by exposure to rain, snow, or other alien material falling or blowing into the receptacle. It will also be understood that because any portion of the cover member 5 may be flexed upwardly to gain access to the feed material 3, the protected feeder 1 is limited in the number of cattle it can service only by the size of the receptacle 2. Also, different portions of the flexible cover member 5 deflect substantially independently of the rest of the cover 5 and livestock may thereby access the receptacle 2 singly or in groups without substantially decreasing the protecting afforded the feed material 3 from the elements, because portions of the cover member 5 not deflected upwardly by livestock will tend to remain in covering relation over the open top of the receptacle 2.

Although the cover member 5 of the present embodiment forms two arcuate access openings 38 when not being used and allowed to hang freely, it is foreseen that the cover member 5 may have more such arcuate openings around its marginal portion 25 in which case the operative cover would have a scalloped appearance or, as another possibility, where no openings are desired the cover member 5 could engage the entire receptacle top edge 14 until raised by an animal desiring to feed therein.

Figure 6:
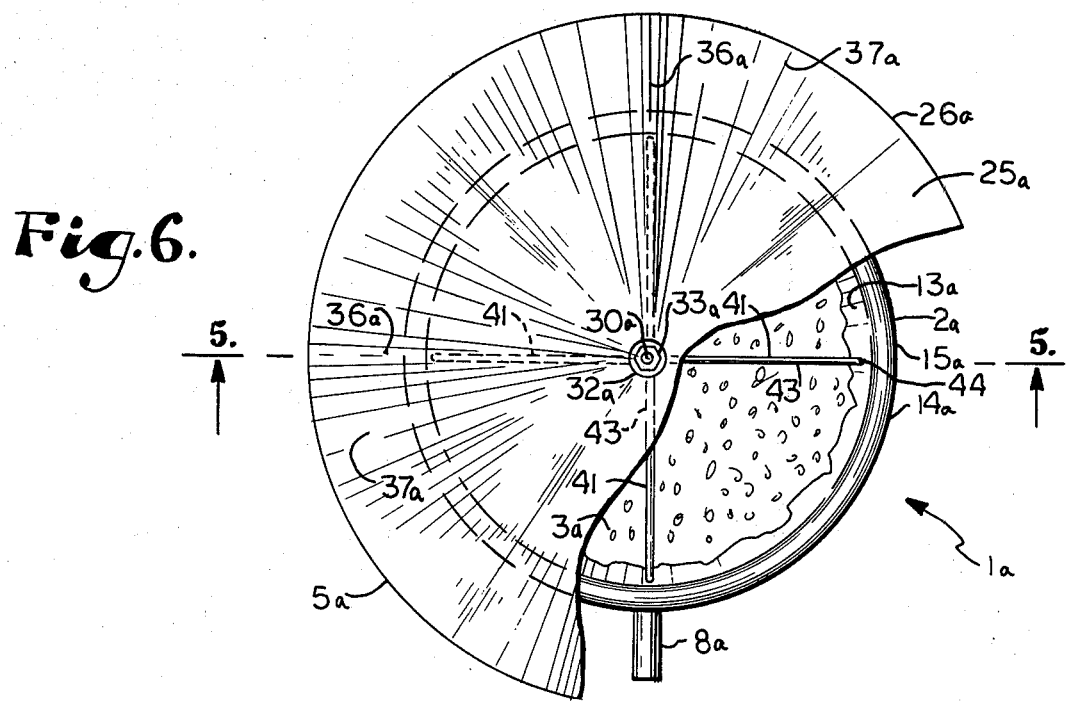
FIG. 6 is a top plan view of the modified form of the protected feeder shown with portions broken away to better illustrate component parts thereof.

The reference numeral 1a (FIGS. 5 and 6) generally represents a second embodiment of the invention. Since the protected feeder 1a is otherwise substantially the same as the previously described apparatus 1, similar parts appearing in FIGS. 5 and 6 and FIGS. 1 through 4 respectively are represented by the same corresponding reference numeral except for the addition of the suffix "a" to the numerals of the second embodiment.

The protected feeder 1a of the second embodiment includes a flexible cover member 5a of suitable size such that a marginal portion 25a thereof extends outwardly to a peripheral edge 26a substantially beyond a top edge 14a of a receptacle 2a. In addition to providing protection for feed material 3a, the marginal portion 25a also allows livestock to engage the cover member 5a from underneath and thereby upwardly displace the flexible cover member 5a. A plurality of circumferentially spaced spokes 41 are attached to the upper end 9a of the telescoping member 19a and extend outwardly and radially therefrom and are adapted for supporting the flexible cover member 5a thereon. The spokes 41 include a horizontal portion 43, a bent portion 44 and a downwardly and inwardly extending portion 45 which is substantially parallel with a side wall 13a of the receptacle 2a. The downwardly and inwardly extending portion 45 of the spokes 41 are spaced inwardly from the receptacle side wall 13a. The spokes 41 terminate at distal ends 46 which are in spaced relationship below the top edge 14a of the receptacle 2a whereby livestock accessing the feed material 3a are not injured by contact therewith.

Because the cover member 5a is flexible and pliable, portions 37a thereof which are not directly supported, such as those between the spokes 41, tend to sag somewhat and slope downwardly and have contact with the top edge 14a of the receptacle 2a thereby defining contours 36a with downwardly flexing portions 37a therebetween which give the cover member 5a a scalloped appearance when not in use such that the cover member 52 is allowed to hang freely. Arcuate access openings 38a are thereby defined by the flexible cover member 5a between the marginal portion 25a and the top edge 14a of the receptacle side wall 13a. The arcuate access openings 38a occur outwardly from the spokes 41 which are circumferentially spaced whereby livestock may feed therebetween. The arcuate access openings 38a allow the livestock to see the feed material 3a in the receptacle 2a and have easy access thereto, however, as with the first described embodiment of the present invention the livestock may access the receptacle 2a at any point around the rim 15a thereof except where the spokes 41 prevent such access. Therefore, while timid livestock may be inclined to access the receptacle 2a through the arcuate access openings 38a as with the first embodiment, more aggressive livestock may upwardly deflect the downwardly flexing portions 37a of the cover member 5a at any point around the marginal portion 25a thereof and thereby use the protected feeder 1a.

While the second embodiment of the invention disclosed herein teaches using four spokes 41 for supporting the flexible cover member 5a, it will be readily apparent that fewer or more spokes 41 may be utilized to define virtually any number of contours 36a and arcuate access openings 38a.

It is foreseen that although circular feed receptacles 2 and 2a and cover members 5 and 5a have been disclosed herein, other shapes such as rectangular or square receptacles and/or covers could be utilized according to the present invention. A variety of configurations of the present invention may thereby be employed to satisfy the needs of livestock under different feeding conditions. It is also foreseen that the protected feeder 1 or 1a could be utilized in combination with other devices such as livestock insecticide applicators.

It is to be understood that while certain forms of the present invention have been described and illustrated, it is not to be limited to the specific forms or arrangements of parts herein described and shown.

What is claimed and desired to secure by Letters Patent is:

1. A protected feeder for livestock comprising:
   (a) a support structure;
   (b) a receptacle having an open top and a side wall with a top edge; said receptacle being adapted for supporting livestock attracting material therein, said open top being of a size permitting livestock to have access therethrough to the attracting material in said receptacle; said receptacle being supported by said support structure;
   (c) a flexible cover member mounted on said support structure in covering relation to the open top of said receptacle with a central portion at a level above the level of said top edge and having a marginal portion engaging the top edge of the receptacle and extending substantially outwardly thereof, whereby livestock are allowed to gain access thereto by upwardly flexing said cover member;
   (d) means for controlling any sagging tendency of said cover member; said means being supported by said support structure and having engagement with said cover member;
   (e) said cover member being circular and of substantially uniform thickness;
   (f) said cover member being centrally mounted on said support structure and radiating outwardly therefrom; and
   (g) said means for controlling sagging tendency of said cover member comprises an inherent characteristic of said cover member to be partially self supporting.

2. A feeder as set forth in claim 1 wherein:
   (a) said means for controlling any sagging tendency of said cover member includes a plurality of spokes extending outwardly from said support structure; said spokes having engagement with said cover member and being adapted to control any sagging tendency thereof; and
   (b) said spokes are in spaced relationship whereby livestock are allowed access to said livestock attracting material between said spokes.

3. A feeder as set forth in claim 1 wherein:
   (a) said support structure includes an upright member with a vertical axis and adapted for supporting said receptacle and said flexible cover member thereon.

4. A feeder as set forth in claim 3 wherein:
   (a) said cover member tends to sag due to the force of gravity whereby sections thereof extending outwardly from said upright member deflect downwardly towards said marginal portion thereby defining contours between said sections; and
   (b) said contours define arcuate access openings between said marginal portion of said flexible cover member and said receptacle wall top edge.

5. A feeder as set forth in claim 4 wherein:
   (a) said flexible cover member is attached at the center thereof to said support structure;
   (b) said flexible cover member has a generally arched configuration when not disturbed by livestock;
   (c) said contours are at opposite ends of said arched configuration; and wherein
   (d) said livestock may raise said flexible cover member at said arcuate access openings as well as at any point along said marginal edge of the flexible cover member such that the livestock may partake of the livestock attracting material within said receptacle.

6. A feeder as set forth in claim 3 which includes:
   (a) said receptacle and said flexible cover member being rotatable mounted with respect to said upright member for free rotation about the vertical axis thereof;
   (b) said receptacle and said flexible cover member being slidably movable with respect to said upright member; and
   (c) means to secure said receptacle and said flexible cover member in a selected position along said upright member.

7. A feeder as set forth in claim 6 wherein said means to secure said receptacle and said flexible cover member on said upright member includes:
   (a) a telescoping member slidably engaging said upright member and being adapted for free rotation about the vertical axis thereof:
   (b) means to support said telescoping member in a selected position along said upright member;
   (c) a receptacle support frame slidably engaging and securable to telescoping member and being adapted to support said receptacle thereon; and
   (d) means to secure said flexible cover member to said telescoping member.

8. A feeder as set forth in claim 7 wherein:
   (a) said means to support said telescoping member along said upright member includes:
      (1) a first annular collar member slidably movable along and securable to said upright member; and
   (b) said receptacle support frame comprises:
      (1) a second annular collar member slidably movable along said telescoping member and adapted for securing said frame in a selected position on said telescoping member;
      (2) a plurality of circumferentially spaced arms extending radially outwardly and upwardly from said second annular collar member, each of said arms having an end fixedly attached to said second annular collar member and an opposite end; and
      (3) a peripheral member connecting said opposite ends of said arms and adapted for engaging and supporting said receptacle.

9. A feeder as set forth in claim 8 which includes:

(a) said receptacle support frame being detachable from said support structure; and
(b) said receptacle support frame being stackable substantially within a similar receptacle support frame.

10. An apparatus for feeding livestock comprising:
(a) a support structure having a base and an upright member with a vertical axis extending upwardly from said base;
(b) a receptacle having an open top, an enclosure forming side wall with a top edge, and a bottom wall; said receptacle being adapted for supporting livestock attracting material therein, said open top being of a size permitting one or more livestock to have access therethrough to the livestock attracting material in said receptacle;
(c) a flexible cover member mounted on said upright member in covering relation to the open top of said receptacle with a central portion at a level above the level of said top edge and having a peripheral portion extending substantially outwardly thereof, whereby livestock are allowed to engage the peripheral portion of said cover member and to gain access to said receptacle by upwardly flexing a portion of said cover member;
(d) said cover member having a sagging tendency such that sections thereof extending outwardly from said upright member deflect downwardly towards said top edge with contours between said sections;
(e) a plurality of spokes extending outwardly from said support structure; said spokes having engagement with said cover member and being adapted to support same and control any sagging tendency thereof;
(f) said downwardly deflecting sections being spaced between said spokes;
(g) said spokes being in spaced relationship whereby livestock are allowed access to said livestock attracting material between said spokes; and
(h) said contours define arcuate access openings between the peripheral portion of said flexible cover member and said receptacle side wall top edge.

11. An apparatus as set forth in claim 10 wherein:
(a) the cover member engages near said peripheral portion thereof said top edge of the receptacle side wall.

12. An apparatus as set forth in claim 10 which includes:
(a) said receptacle and said flexible cover member being rotatably mounted with respect to said upright member for free rotation about the vertical axis thereof;
(b) said receptacle and said flexible cover member being slidably movable with respect to said upright member; and
(c) means to secure said receptacle and said flexible cover member in a selected position along said upright member.

13. An apparatus as set forth in claim 12 wherein said means to secure said receptacle and said flexible cover member along said upright member includes:
(a) a telescoping member slidably engaging said upright member and being adapted for free rotation about the vertical axis thereof;
(b) means to support said telescoping member in a selected position along said upright member;
(c) a receptacle support frame slidably engaging and securable to said telescoping member and being adapted to support said receptacle thereon; and
(d) means to secure said flexible cover member to said telescoping member.

14. A device for feeding livestock comprising:
(a) a support structure having a base and an upright member with a vertical axis, said upright member being attached to and extending vertically from said base;
(b) a receptacle having an open top, an enclosure forming side wall with a top edge, and a bottom wall; said receptacle being adapted for supporting livestock attracting material therein; said open top being of a size permitting one or more livestock to have access therethrough to the livestock attracting material in said receptacle;
(c) a telescoping member slidably engaging said upright member and being adapted for free rotation about the vertical axis thereof;
(d) a first annular collar member slidably movable along said upright member and adapted for supporting said telescoping member in a selected position on said upright member;
(e) a receptacle support frame slidably engaging and securable to said telescoping member and being adapted to support said receptacle thereon, said receptacle support frame including:
  (1) a second annular collar member slidably movable along said telescoping member and adapted for securing said frame in a selected position on said telescoping member;
  (2) a plurality of circumferentially spaced arms extending radially outwardly and upwardly from said second annular collar member, each of said arms having an end fixedly attached to said second annular collar member and an opposite end; and
  (3) a peripheral member connecting said opposite ends of said arms and adapted for engaging and supporting said receptacle;
(f) a substantially impervious and flexible cover member with a central portion mounted on said telescoping member above the level of said top edge of the receptacle for covering and protecting the livestock attracting material supported by said receptacle; said cover member having a peripheral portion extending substantially outwardly of said top edge of the receptacle side wall; said cover member being in covering relation to said open top of said receptacle such that said cover member must be flexed and displaced upwardly by livestock to allow the livestock to gain access to the livestock attracting material contained in said receptacle; said peripheral portion permitting livestock to engage and displace said cover member upwardly sufficiently to provide access by the livestock to the livestock attracting material in said receptacle; and
(g) a cover reinforcing member comprising:
  (1) a plurality of circumferentially spaced spokes attached to said telescoping member and extending horizontally and radially from said telescoping member beneath said cover member; said spokes being for controlling any sagging tendency of said cover member;

(2) said spokes being in spaced relationship whereby livestock attracting material between said spokes; and (3) said spokes supporting sections of the peripheral portion of the cover member above the top edge of said receptacle; thereby defining access openings between said peripheral portion and said receptacle top edge.

15. A protected feeder structure for livestock comprising:

(a) an upright support structure having a cover, ground-engaging end portion and a central upright member;

(b) a receptacle mounted on said support structure for containing a quantity of livestock attracting material, said receptacle having a bottom portion and a surrounding sidewall defining an open top sized to admit the muzzles of livestock;

(c) said central upright member extending upwardly through said bottom portion and terminating a distance above said sidewall;

(d) a cover member having a central portion mounted to said upright member generally at the termination thereof and spreading outwardly over said open top in protective, covering relation with a surrounding marginal portion resting upon said sidewall, said cover member being resiliently flexible for lifting by livestock from any direction therearound to gain access to said receptacle and the livestock attracting material therein by flexing upwardly said marginal portion; and (e) stiffener means in said cover means providing at least partial self support and controlling any sagging tendency thereof to maintain said cover member in protective relationship to said receptacle.

* * * * *